US009569385B2

(12) United States Patent
Ahmad et al.

(10) Patent No.: US 9,569,385 B2
(45) Date of Patent: Feb. 14, 2017

(54) MEMORY TRANSACTION ORDERING (71) Applicant: NVIDIA Corporation, Santa Clara, CA (US)

(72) Inventors: Sagheer Ahmad, Cupertino, CA (US); Dick Reohr, Hillsboro, OR (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 14/021,903

(22) Filed: Sep. 9, 2013

(65) Prior Publication Data
US 2015/0074315 A1 Mar. 12, 2015

(51) Int. Cl.
G06F 13/12 (2006.01)
G06F 13/38 (2006.01)
G06F 13/28 (2006.01)

(52) U.S. Cl.
CPC .................................. *G06F 13/287* (2013.01)

(58) Field of Classification Search
CPC .................................................. G06F 13/287
USPC .......................................................... 710/62
See application file for complete search history.

(56) References Cited

U.S. PATENT DOCUMENTS

| 4,620,217 | A | 10/1986 | Songer |
| 4,648,045 | A | 3/1987 | Demetrescu |
| 4,700,319 | A | 10/1987 | Steiner |
| 4,862,392 | A | 8/1989 | Steiner |
| 4,901,224 | A | 2/1990 | Ewert |
| 5,185,856 | A | 2/1993 | Alcorn et al. |
| 5,268,995 | A | 12/1993 | Diefendorff et al. |
| 5,276,838 | A * | 1/1994 | Rao et al. ..................... 711/117 |
| 5,285,323 | A | 2/1994 | Hetherington et al. |
| 5,357,604 | A | 10/1994 | San et al. |
| 5,392,393 | A | 2/1995 | Deering |
| 5,487,022 | A | 1/1996 | Simpson et al. |
| 5,488,687 | A | 1/1996 | Rich |
| 5,491,496 | A | 2/1996 | Tomiyasu |
| 5,546,548 | A | 8/1996 | Chen et al. |
| 5,577,213 | A | 11/1996 | Avery et al. |
| 5,579,473 | A | 11/1996 | Schlapp et al. |

(Continued)

FOREIGN PATENT DOCUMENTS

| CN | 1954338 | 5/2004 |
| CN | 101091203 | 5/2004 |

(Continued)

OTHER PUBLICATIONS

"Battery Charging Specification", "USB Implementers Forum, Inc.", Dated: Mar. 8, 2007, pp. 1-29, Revision 1.0.

(Continued)

*Primary Examiner* — Chun-Kuan Lee (57) ABSTRACT

Embodiments are disclosed relating to methods of ordering transactions across a bus of a computing device. One embodiment of a method includes determining a current target memory channel for an incoming transaction request, and passing the incoming transaction request downstream if the current target memory channel matches an outstanding target memory channel indicated by a direction bit of a counter or the counter equals zero. The method further includes holding the incoming transaction request if the counter is greater than zero and the current target memory channel does not match the outstanding target memory channel.

20 Claims, 4 Drawing Sheets

(56) References Cited

U.S. PATENT DOCUMENTS

| | | |
|---|---|---|
| 5,579,476 A | 11/1996 | Cheng et al. |
| 5,581,721 A | 12/1996 | Wada et al. |
| 5,600,584 A | 2/1997 | Schlafly |
| 5,604,824 A | 2/1997 | Chui et al. |
| 5,613,050 A | 3/1997 | Hochmuth et al. |
| 5,655,132 A | 8/1997 | Watson |
| 5,701,444 A | 12/1997 | Baldwin |
| 5,761,468 A | 6/1998 | Emberson |
| 5,764,228 A | 6/1998 | Baldwin |
| 5,768,548 A | 6/1998 | Young et al. |
| 5,777,628 A | 7/1998 | Buck-Gengler |
| 5,790,817 A | 8/1998 | Asghar et al. |
| 5,831,640 A | 11/1998 | Wang et al. |
| 5,850,572 A | 12/1998 | Dierke |
| 5,864,342 A | 1/1999 | Kajiya et al. |
| 5,881,248 A | 3/1999 | Mergard |
| 5,923,859 A | 7/1999 | Melo et al. |
| 5,941,940 A | 8/1999 | Prasad et al. |
| 5,995,121 A | 11/1999 | Alcorn et al. |
| 6,018,803 A | 1/2000 | Kardach |
| 6,029,228 A | 2/2000 | Cai et al. |
| 6,085,276 A | 7/2000 | VanDoren et al. |
| 6,101,568 A | 8/2000 | Richardson |
| 6,157,980 A | 12/2000 | Arimilli et al. |
| 6,166,743 A | 12/2000 | Tanaka |
| 6,173,366 B1 | 1/2001 | Thayer et al. |
| 6,182,112 B1 | 1/2001 | Malek et al. |
| 6,222,550 B1 | 4/2001 | Rosman et al. |
| 6,229,553 B1 | 5/2001 | Duluk, Jr. et al. |
| 6,233,656 B1 | 5/2001 | Jones et al. |
| 6,259,460 B1 | 7/2001 | Gossett et al. |
| 6,266,742 B1 | 7/2001 | Challenger et al. |
| 6,288,730 B1 | 9/2001 | Duluk, Jr. et al. |
| 6,314,472 B1 | 11/2001 | Trieu et al. |
| 6,333,744 B1 | 12/2001 | Kirk et al. |
| 6,345,341 B1 | 2/2002 | Arimilli et al. |
| 6,351,806 B1 | 2/2002 | Wyland |
| 6,353,439 B1 | 3/2002 | Lindholm et al. |
| 6,397,296 B1 | 5/2002 | Werner |
| 6,407,740 B1 | 6/2002 | Chan |
| 6,411,130 B1 | 6/2002 | Gater |
| 6,411,301 B1 | 6/2002 | Parikh et al. |
| 6,417,851 B1 | 7/2002 | Lindholm et al. |
| 6,466,222 B1 | 10/2002 | Kao et al. |
| 6,480,939 B2 | 11/2002 | Anderson et al. |
| 6,496,537 B1 | 12/2002 | Kranawetter et al. |
| 6,525,737 B1 | 2/2003 | Duluk, Jr. et al. |
| 6,526,430 B1 | 2/2003 | Hung et al. |
| 6,526,518 B1 | 2/2003 | Catlin et al. |
| 6,542,971 B1 | 4/2003 | Reed |
| 6,557,022 B1 | 4/2003 | Sih et al. |
| 6,571,318 B1 | 5/2003 | Sander et al. |
| 6,574,712 B1 | 6/2003 | Kahle et al. |
| 6,578,102 B1 | 6/2003 | Batchelor et al. |
| 6,597,363 B1 | 7/2003 | Duluk, Jr. et al. |
| 6,604,188 B1 | 8/2003 | Coon et al. |
| 6,624,818 B1 | 9/2003 | Mantor et al. |
| 6,636,221 B1 | 10/2003 | Morein |
| 6,664,958 B1 | 12/2003 | Leather et al. |
| 6,696,854 B2 | 2/2004 | Momtaz et al. |
| 6,696,954 B2 | 2/2004 | Chung |
| 6,717,577 B1 | 4/2004 | Cheng et al. |
| 6,718,542 B1 | 4/2004 | Kosche et al. |
| 6,731,288 B2 | 5/2004 | Parsons et al. |
| 6,734,861 B1 | 5/2004 | Van Dyke et al. |
| 6,738,870 B2 | 5/2004 | Van Huben et al. |
| 6,778,181 B1 | 8/2004 | Kilgariff et al. |
| 6,782,457 B2 | 8/2004 | Hill et al. |
| 6,806,886 B1 | 10/2004 | Zatz |
| 6,839,828 B2 | 1/2005 | Gschwind et al. |
| 6,910,106 B2 | 6/2005 | Sechrest et al. |
| 6,924,808 B2 | 8/2005 | Kurihara et al. |
| 6,947,053 B2 | 9/2005 | Malka et al. |
| 6,950,892 B2 | 9/2005 | Bell, Jr. et al. |
| 6,961,821 B2 | 11/2005 | Robinson |
| 6,980,209 B1 | 12/2005 | Donham et al. |
| 6,980,222 B2 | 12/2005 | Marion et al. |
| 6,996,684 B2 | 2/2006 | Tseng et al. |
| 6,999,100 B1 | 2/2006 | Leather et al. |
| 6,999,426 B2 | 2/2006 | Miyoshi |
| 7,032,046 B2 | 4/2006 | Horii et al. |
| 7,034,828 B1 | 4/2006 | Drebin et al. |
| 7,096,291 B2 | 8/2006 | Lin |
| 7,139,878 B2 | 11/2006 | Malik et al. |
| 7,158,141 B2 | 1/2007 | Chung et al. |
| 7,177,985 B1 | 2/2007 | Diefendorff |
| 7,187,383 B2 | 3/2007 | Kent |
| 7,225,299 B1 | 5/2007 | Rozas et al. |
| 7,257,814 B1 | 8/2007 | Melvin et al. |
| 7,263,566 B2 | 8/2007 | Ganasan et al. |
| 7,280,112 B1 | 10/2007 | Hutchins |
| 7,298,375 B1 | 11/2007 | Hutchins |
| 7,376,798 B1 | 5/2008 | Rozas |
| 7,376,846 B2 | 5/2008 | Hawkins et al. |
| 7,430,654 B2 | 9/2008 | Huang et al. |
| 7,450,120 B1 | 11/2008 | Hakura et al. |
| 7,477,260 B1 | 1/2009 | Nordquist |
| 7,505,461 B2 | 3/2009 | Matsuda et al. |
| 7,600,058 B1 | 10/2009 | Danilak |
| 7,627,730 B1 | 12/2009 | Moll |
| 7,659,909 B1 | 2/2010 | Hutchins |
| 7,706,756 B2 | 4/2010 | Sato et al. |
| 7,710,427 B1 | 5/2010 | Hutchins et al. |
| 7,873,793 B1 | 1/2011 | Rozas et al. |
| 7,895,385 B2 | 2/2011 | Raju |
| 7,928,990 B2 | 4/2011 | Jiao et al. |
| 7,941,645 B1 | 5/2011 | Riach et al. |
| 7,969,446 B2 | 6/2011 | Hutchins et al. |
| 8,055,871 B1 | 11/2011 | Schulze et al. |
| 8,370,552 B2 | 2/2013 | Mittal et al. |
| 8,537,168 B1 | 9/2013 | Steiner et al. |
| 8,656,198 B2 | 2/2014 | Branover et al. |
| 8,773,447 B1 | 7/2014 | Donham |
| 8,860,722 B2 | 10/2014 | Cabral et al. |
| 9,104,421 B2 | 8/2015 | Ahmad et al. |
| 9,411,595 B2 | 8/2016 | Rozas |
| 2001/0001873 A1 | 5/2001 | Wickeraad et al. |
| 2001/0014928 A1 | 8/2001 | Chrysos et al. |
| 2002/0023204 A1 | 2/2002 | Barowski et al. |
| 2002/0056027 A1 | 5/2002 | Kanai et al. |
| 2002/0105519 A1 | 8/2002 | Lindholm et al. |
| 2002/0126126 A1 | 9/2002 | Baldwin |
| 2002/0129223 A1 | 9/2002 | Takayama et al. |
| 2002/0144054 A1 | 10/2002 | Fanning et al. |
| 2002/0169942 A1 | 11/2002 | Sugimoto |
| 2003/0115233 A1 | 6/2003 | Hou et al. |
| 2003/0126355 A1 | 7/2003 | David |
| 2003/0189565 A1 | 10/2003 | Lindholm et al. |
| 2003/0191880 A1 | 10/2003 | Lin |
| 2003/0229762 A1 | 12/2003 | Maiyuran et al. |
| 2004/0012597 A1 | 1/2004 | Zatz et al. |
| 2004/0012599 A1 | 1/2004 | Laws |
| 2004/0012600 A1 | 1/2004 | Deering et al. |
| 2004/0024260 A1 | 2/2004 | Winkler et al. |
| 2004/0024947 A1 | 2/2004 | Barth et al. |
| 2004/0049641 A1 | 3/2004 | So et al. |
| 2004/0064649 A1 | 4/2004 | Volpe et al. |
| 2004/0083341 A1 | 4/2004 | Robinson et al. |
| 2004/0088458 A1 | 5/2004 | Tomlinson et al. |
| 2004/0100474 A1 | 5/2004 | Demers et al. |
| 2004/0114813 A1 | 6/2004 | Boliek et al. |
| 2004/0117606 A1 | 6/2004 | Wang et al. |
| 2004/0119710 A1 | 6/2004 | Piazza et al. |
| 2004/0123043 A1 | 6/2004 | Rotithor et al. |
| 2004/0126035 A1 | 7/2004 | Kyo |
| 2004/0130552 A1 | 7/2004 | Duluk, Jr. et al. |
| 2004/0194084 A1 | 9/2004 | Matsunami et al. |
| 2004/0201647 A1 | 10/2004 | Jackson Pulver et al. |
| 2004/0246260 A1 | 12/2004 | Kim et al. |
| 2005/0081014 A1 | 4/2005 | Tran et al. |
| 2005/0086644 A1 | 4/2005 | Chkodrov et al. |
| 2005/0122330 A1 | 6/2005 | Boyd et al. |
| 2005/0134588 A1 | 6/2005 | Aila et al. |
| 2005/0135433 A1 | 6/2005 | Chang et al. |

(56) References Cited

U.S. PATENT DOCUMENTS

| | | |
|---|---|---|
| 2005/0138254 A1 | 6/2005 | Raghavan et al. |
| 2005/0162436 A1 | 7/2005 | Van Hook et al. |
| 2005/0216607 A1 | 9/2005 | Munguia |
| 2005/0223195 A1 | 10/2005 | Kawaguchi |
| 2005/0231506 A1 | 10/2005 | Simpson et al. |
| 2005/0237337 A1 | 10/2005 | Leather et al. |
| 2005/0280655 A1 | 12/2005 | Hutchins et al. |
| 2006/0007234 A1 | 1/2006 | Hutchins et al. |
| 2006/0028469 A1 | 2/2006 | Engel |
| 2006/0152519 A1 | 7/2006 | Hutchins et al. |
| 2006/0155964 A1 | 7/2006 | Totsuka |
| 2006/0177122 A1 | 8/2006 | Yasue |
| 2006/0288195 A1 | 12/2006 | Ma et al. |
| 2007/0030278 A1 | 2/2007 | Prokopenko et al. |
| 2007/0165029 A1 | 7/2007 | Lee et al. |
| 2007/0198758 A1 | 8/2007 | Asano et al. |
| 2007/0236495 A1 | 10/2007 | Gruber et al. |
| 2007/0279408 A1 | 12/2007 | Zheng et al. |
| 2007/0285427 A1 | 12/2007 | Morein et al. |
| 2007/0288902 A1 | 12/2007 | Lev et al. |
| 2009/0055566 A1 | 2/2009 | Reinig et al. |
| 2009/0089477 A1 | 4/2009 | Reed |
| 2009/0228631 A1 | 9/2009 | Marulkar et al. |
| 2010/0023707 A1 | 1/2010 | Hohmuth et al. |
| 2010/0057973 A1 | 3/2010 | Barake et al. |
| 2010/0211933 A1 | 8/2010 | Kiel et al. |
| 2010/0250972 A1 | 9/2010 | Freitas |
| 2010/0318741 A1 | 12/2010 | Scott et al. |
| 2011/0320839 A1 | 12/2011 | David et al. |
| 2012/0144126 A1 | 6/2012 | Nimmala et al. |
| 2014/0181404 A1 | 6/2014 | Chaudhary et al. |
| 2014/0237609 A1* | 8/2014 | Sharp et al. ................ 726/26 |
| 2014/0372990 A1 | 12/2014 | Strauss |

FOREIGN PATENT DOCUMENTS

| | | |
|---|---|---|
| EP | 1665165 | 5/2004 |
| EP | 1745434 | 5/2004 |
| EP | 1771824 | 5/2004 |
| JP | 0510979 A2 | 6/1993 |
| JP | 11053187 A2 | 2/1999 |
| JP | 2000047872 A2 | 2/2000 |
| JP | 2002073330 A2 | 3/2002 |
| JP | 2002171401 | 6/2002 |
| JP | 2004199222 | 7/2004 |
| JP | 2006196004 | 7/2006 |
| JP | 2008161169 | 7/2008 |
| WO | 006007127 | 5/2004 |
| WO | 2005112592 | 5/2004 |
| WO | 2005114582 | 12/2005 |
| WO | 2005114646 | 12/2005 |

OTHER PUBLICATIONS

"Device Class Specification Adopters Agreement", Downloaded Circa: Mar. 10, 2007, pp. 1-5.
Frittis, "Multi-Level Memory Prefetching for Media and Stream Processing", Proceedings. 2002 IEEE International conference on Multimedia and Expo, 2002.ICME '02. vol. 2, Aug. 26-29, 2002.
Carter et al., "Impulse: Building a Smarter Memory Controller". Proceedings, Fifth International Symposiun on High Performance Computer Architecture. Jan. 9-13, 1999.
"Using Spin-Loops on Intel Pentium 4 Processor and Intel Xeon Processor", Version 2.1, May 2001.
Jouppi, N. P., "Improving Direct-Mapped Cache Performance by the Addition of a Small Fully-Associative Cache and Prefetch Buffers", Proceedings. 17th Annual International Symposium on Computer Architecture, 1990. May 28-31, 1990.
"Interleaved Memory." Dec. 26, 2002. http://www.webopedia.comiTERM/I/interleaved_memory.html.
Pirazzi, Chris. "Fields, F1/F2, Interleave, Field Dominance and More." Nov. 4, 2001 http://lurkertech.com/lg/dominance.html.
Hennessy, et al., Computer Organization and Design: The Hardware/Software Interface, 1997, Section 6.5.
Moller, et al.; Real-Time Rendering, 2nd ed., 2002, A K Peters Ltd., pp. 92-99, 2002.
Hollasch; IEEE Standard 754 Floating Point Numbers; http://steve.hollasch.net/cgindex/coding/ieeefloathtml; dated Feb. 24, 2005; retrieved Oct. 21, 2010.
Microsoft; (Complete) Tutorial to Understand IEEE Floating-Point Errors; http://support.microsoft.com/kb/42980; dated Aug. 16, 2005; retrieved Oct. 21, 2010.
The Free Online Dictionary, Thesaurus and Encyclopedia, definition for cache; http://www.thefreedictionary.com/cache; retrieved Aug. 17, 2012.
Wolfe A, et al., "A Superscalar 3D graphics engine", MICRO-32. Proceedings of the 32nd annual ACM/IEEE International Symposium on Microarchitecture. Haifa, Israel, Nov. 16-18, 1999;.
Zaharieva-Stoyanova E I: "Data-flow analysis in superscalar computer architecture execution," Tellecommunications in Modern Satellite, Cable and Broadcasting Services, 2003.
"Sideband," http://www.encyclopedia.com/html/s1/sideband.asp.
Pixar, Inc.; PhotoRealistic RenderMan 3.9 Shading Language Extensions; Sep. 1999.

\* cited by examiner

MEMORY TRANSACTION ORDERING

BACKGROUND

On-chip communications between memory channels and a central processing unit (CPU) may be serviced by a bus having a single port to access address space provided by the memory channels. Transactions, such as read and/or write requests, may target different types of memory, such as cacheable, non-cacheable, device, and strongly-ordered memory types. Protocols governing the function of the bus may specify that transactions having the same identifier and/or targeting the same type of memory are transmitted to a requested memory channel in order, and responses are returned in order. Order can be maintained by keeping track of identifiers for every outstanding transaction on all outgoing ports, enabling transaction requests and/or responses to be reordered based on the tracked information. However, such tracking involves memory resources and associated logic to store and process the tracked information, and can result in processing delays.

A transaction identifier may represent a memory type, such as cacheable, non-cacheable, device, and strongly-ordered memory types. Typically, transactions of a particular memory type are targeted to a particular memory channel; however it is possible for transactions having the same memory type to target different memory channels. As indicated above, it may be desirable to maintain transaction ordering per identifier. For example, in certain settings, it can be important to perform order tracking for all transactions targeting strongly ordered memory in order.

DETAILED DESCRIPTION

Memory channels often process requests from a central processing unit (CPU) in the order received, however one memory channel may process requests at a different rate than other channels. For some on-chip communication specifications and protocols, transactions between memory channels and CPUs are governed by ordering rules to ensure accurate responses and prevent errors in the system. However, while order may be maintained within each memory channel, order is not guaranteed in implementations with multiple memory channels. Embodiments are disclosed herein for selectively holding transactions to ensure that transaction requests are sent or responses are received in accordance with ordering rules associated with an on-chip communication specification.

Figure 1:
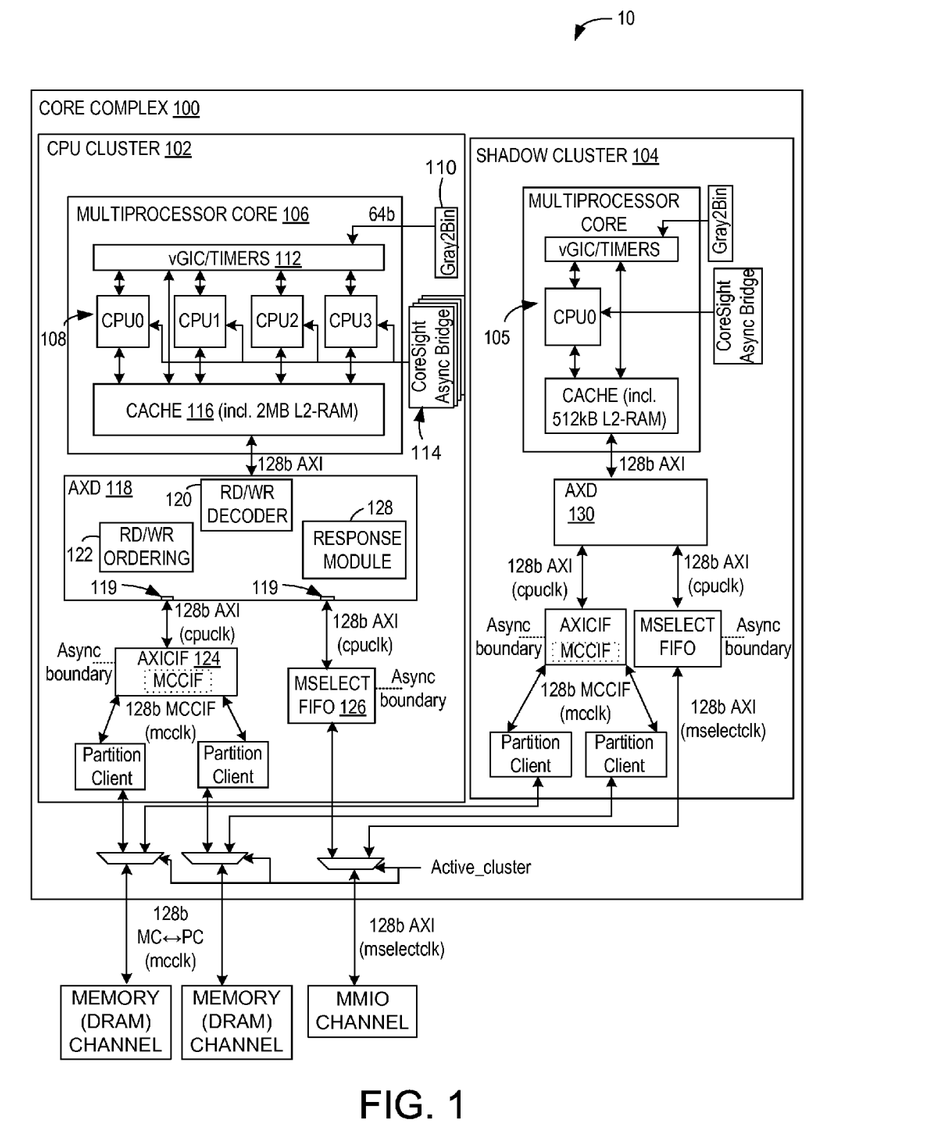
FIG. 1 is a block diagram of a CPU complex with an AXI demultiplexer in accordance with an embodiment of the present disclosure.

FIG. 1 shows an example computing system 10 including a CPU core complex 100. The CPU core complex 100 includes a main CPU cluster 102 and a companion Shadow Cluster 104. The main CPU cluster 102 includes a multiprocessor core 106 having four processor cores including CPUs 108 (e.g., CPU0-CPU3). Although a quad-core configuration is illustrated herein, it is to be understood that any suitable CPU core complex including any number of processor cores may be utilized to perform the methods described herein. In some embodiments, the multiprocessor core 106 may include an ARM architecture processor providing an ARM instruction set. The CPUs 108 may be operated in accordance with any suitable configuration of encoders, timers, and/or bridges, such as gray-to-binary encoder 110, virtual generic interrupt controller (vGIC)/timers 112, and asynchronous bridges 114, as well as cache 116, address decoder 120, bus-bridges 124 & 126, and/or a suitable number of memory interface ports 119. Each of the CPUs 108 may be operatively coupled with cache 116, which may include a cache controller and/or one or more caches. For example, the cache 116 may include a data cache for accelerating data fetch and store operations, an instruction cache to facilitate instruction storage and/or retrieval, and/or caches for other purposes As indicated in FIG. 1, the cache 116 may include 2 MB of L2 RAM, however it is to be understood that any suitable cache may be provided for the CPUs 108.

Each of the CPUs 108 may generate transaction requests, such as read and/or write memory requests, such as DRAM and Memory-mapped I/O (MMIO). For example, a write request may identify a memory channel (e.g., a particular address/address block within a memory channel) and include data to be written to the memory channel. A response to a write request may include an acknowledgement of the write request and/or a confirmation that the data was written to the memory channel. A read request may identify a location in a memory channel from which data is to be received. Accordingly, a response to a read request may include data stored in the identified location in the memory channel.

The CPUs 108 may communicate with memory channels via an Advanced eXtensible Interface (AXI) bus that includes ordering rules for transactions performed with the interface. For example, AXI ordering may include a rule that outstanding transactions with matching AXI identifiers are sent to a target memory channel in order and responses for such transactions are received in order. The AXI identifiers may represent memory type (e.g., cacheable, non-cacheable, device, and strongly-ordered). Cacheable and non-cacheable memory types typically target DRAM, while device and strongly-ordered memory types typically target MMIO. An AXI demultiplexer (AXD) 118 is provided between the cache 116 and the memory channels and/or memory channel interfaces in order to handle transactions between the CPUs 108 and the memory channels. For each of a read and write configuration, the AXD 118 may branch a single AXI bus into a plurality of AXI buses, each communicatively connected to a different memory channel. Accordingly, read and write operations may be performed independently from one another. Although an AXI bus is described herein, it is to be understood that transactions utilizing any suitable bus may be ordered in a similar manner to satisfy the protocol specified by that type of bus. For example, the ordering described herein may be applied to other types of buses, including but not limited to other advanced microcontroller bus architecture (AMBA) buses and/or interfaces, Open Core Interface (OCI) bus, etc.

AXD 118 may include a read/write transaction decoder 120 for decoding an address of an incoming transaction request from a CPU. Based on the address, a read/write transaction ordering module 122 may determine whether to send or hold the transaction request based on outstanding requests for a memory channel targeted by the request, as described in more detail below with respect to FIGS. 2 and 3. Requests from different CPUs of the CPUs 108 may be processed independently from one another, such that an outstanding request for one CPU may not affect the processing of an incoming request for a different CPU. The AXD 118 may include a plurality of ports 119, each port corresponding to a different memory channel. Upon determining that the transaction request may be passed on to the memory channel, the AXD 118 directs the request to the associated port, which may provide access to one of a plurality of AXI buses to the memory channel and/or related interface or buffer. For example, a request targeting DRAM may be passed to AXICIF 124, while a request targeting MMIO may be passed to MSELECT FIFO 126. From such memory interfaces and/or buffers, requests may be passed along to the appropriate memory channel (e.g., memory/DRAM channel and/or MMIO channel).

Responses received from memory channels traverse the same paths as requests, and are received by response module 128 of AXD 118. The response module 128 may update the read/write ordering module 122 on the status of outstanding transactions and send responses back to the appropriate CPU. For example, the response module 128 may inform the read/write ordering module 122 that a transaction response has been received for a particular transaction so that the read/write ordering module 122 may maintain an accurate count of outstanding transactions. Based on the count of outstanding transactions, incoming transaction requests may be passed along to memory channels or temporarily held in order to maintain ordering between transactions on a per-CPU basis. For example, if there are outstanding transactions of a particular memory type (e.g., device or strongly-ordered), incoming transactions for the same memory type are only passed if the incoming transactions target the same memory channel as the outstanding transactions. Accordingly, since each memory channel processes transactions in the order received, the system may ensure that responses for the transactions are received in order. Conversely, if incoming transactions were to be passed to any memory channel, regardless of the target memory channel of outstanding transactions, a response for a later-transmitted transaction may be returned before a response for an earlier-transmitted transaction, thereby disrupting the order of the transactions.

As shown in FIG. 1, the Shadow Cluster 104 may include the same or similar elements as the main CPU cluster 102. The primary difference between the Shadow Cluster 104 and the main CPU cluster 102 is the presence of a single processing core, CPU 105, in the Shadow Cluster 104 and a smaller cache size. For example, the Shadow Cluster 104 may include 512 kB of L2 RAM, while the main CPU cluster 102 includes 2 MB of L2 RAM. Accordingly, the Shadow Cluster 104 may operate similarly to the main CPU cluster 102. As the Shadow Cluster 104 includes a separate AXD 130, transactions for the Shadow Cluster 104 may be processed independently from transactions for the main CPU cluster 102 to maintain ordering between transactions on a per-cluster basis.

Figure 2:
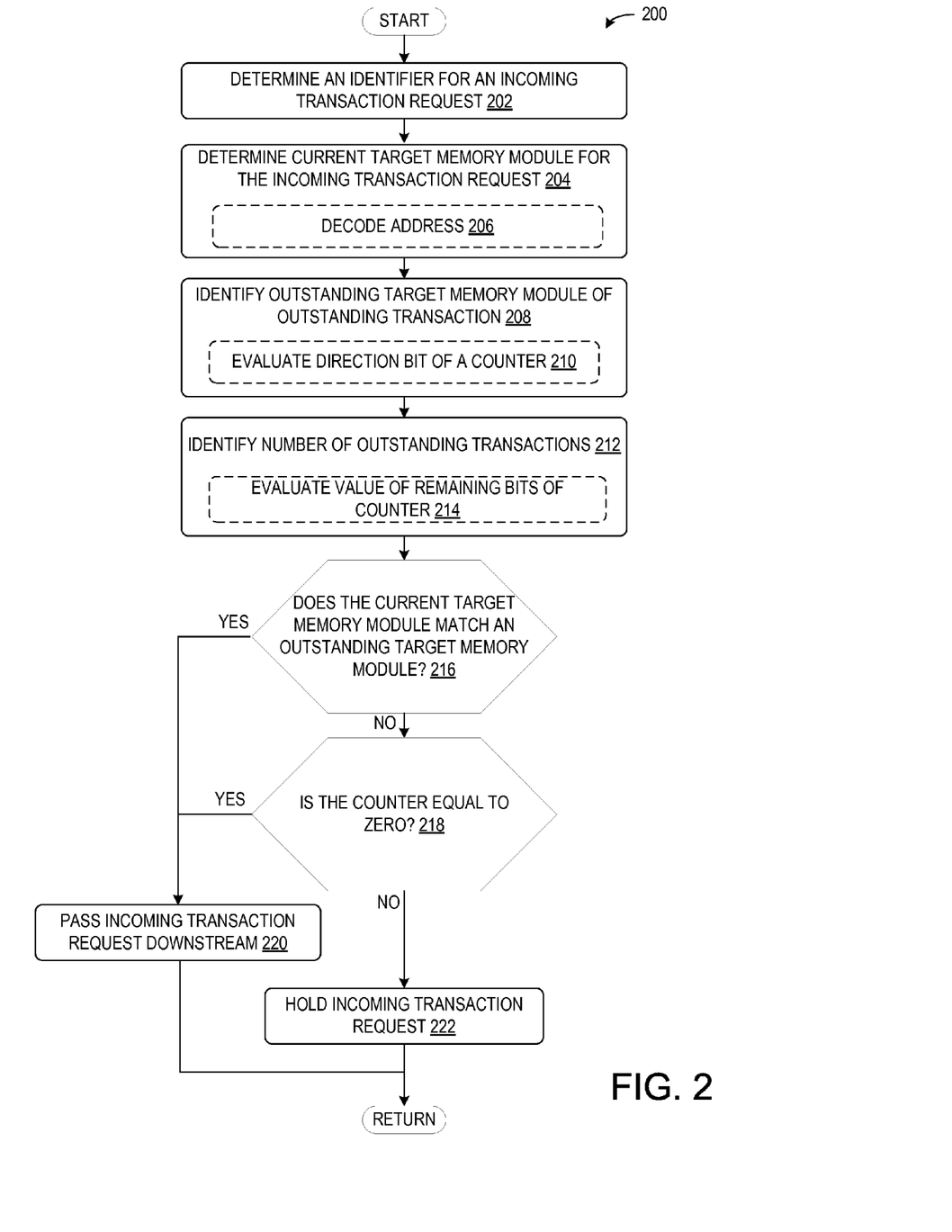
FIG. 2 is a flow chart of a method of ordering transactions across a bus of a computing device in accordance with an embodiment of the present disclosure.

FIG. 2 shows a method 200 of ordering transactions across a bus, such as the AXI bus illustrated in FIG. 1. The method 200 includes determining an identifier for an incoming transaction request, as indicated at 202. For embodiments relating to AXI transactions across an AXI bus, the identifier may be an AXI-ID representing a memory type associated with the transaction (e.g., cacheable, non-cacheable, device, and/or strongly ordered). The identifier may be mapped to the memory type based on a predetermined map stored locally and/or remotely. In some embodiments, the identifier is a 6 bit ID that is provided as a part of the transaction request. In such embodiments, the least two significant bits may identify a CPU core, while the upper four bits may identify the memory type.

At 204, the method 200 includes determining a current target memory channel for the incoming transaction request. The incoming transaction request may include a read request that identifies an address within the current target memory channel. The response to a read request may include the data stored at the identified address of the current target memory channel. Alternatively, the incoming transaction request may include a write request that identifies an address within the current target memory channel and specifies data to be stored in and/or written to the identified address. The response to a write request may include an acknowledgement that the request was received, that the data was successfully stored in the specified location, and/or that an error occurred. Read and write identifiers may be independent of each other and/or different for each CPU. Accordingly, read and write requests may be provided on separate buses, such that the method 200 is performed on each bus independently.

As indicated at 206, the current target memory channel may be determined by decoding an address of the incoming transaction request. For example, the address may be decoded using a predetermined address map matching addresses and/or address ranges to target memory channels. Some addresses and/or address ranges may be fixed to a particular target memory channel, while others may be configurable to be routed to one of a plurality of target memory channels. Table 1 shows an example address map defining the target for ranges of incoming transaction request addresses in accordance with an embodiment of the present disclosure. As described therein, some of the address-map apertures are fixed to MMIO or DRAM, while others are configurable to be routed to MMIO or DRAM. For example, for a system with approximately 2 Gigabytes of DRAM, only "DRAM" aperture will be routed to memory channels, and all others will be routed to MMIO. Additionally, DRAM may include two memory channels, in which case an address-map can be striped (at a configurable granularity, e.g., 1 Kilobyte) between two channels.

TABLE 1

| Aperture | Range | Size | Configurability |
| --- | --- | --- | --- |
| IROM_HIVEC | FFFF_FFFF-FFF0_0000 | 1 MB | Configurable MMIO/DRAM |
| DRAM | FFEF_FFFF-8000_0000 | 2047 MB | Always DRAM |
| AHB_A2_RSVD | 7FFF_FFFF-7E00_0000 | 32 MB | Configurable MMIO/DRAM |
| AHB_A2 | 7DFF_FFFF-7C00_0000 | 32 MB | Always MMIO |
| AHB_A1_RSVD | 7BFF_FFFF-7900_0000 | 48 MB | Configurable MMIO/DRAM |

TABLE 1-continued

| Aperture | Range | Size | Configurability |
|---|---|---|---|
| AHB_A1 | 78FF_FFFF-7800_0000 | 16 MB | Configurable MMIO/DRAM |
| APB_RSVD | 77FF_FFFF-7100_0000 | 112 MB | Configurable MMIO/DRAM |
| APB | 70FF_FFFF-7000_0000 | 16 MB | Always MMIO |
| EXTIO_RSVD | 6FFF_FFFF-6900_0000 | 112 MB | Configurable MMIO/DRAM |
| EXTIO | 68FF_FFFF-6800_0000 | 16 MB | Always MMIO |
| PPSB_RSVD | 67FF_FFFF-6100_0000 | 112 MB | Configurable MMIO/DRAM |
| PPSB | 60FF_FFFF-6000_0000 | 16 MB | Always MMIO |
| GPU_GART | 5FFF_FFFF-5700_0000 | 144 MB | Configurable MMIO/DRAM |
| GFX_HOST_RSVD (HOST1X_DR_RSVD) | 56FF_FFFF-5500_0000 | 32 MB | Configurable MMIO/DRAM |
| GFX_HOST (HOST1X_DR) | 54FF_FFFF-5400_0000 | 16 MB | Always MMIO |
| VERIF_RSVD | 53FF_FFFF-5100_0000 | 48 MB | Configurable MMIO/DRAM |
| HOST1_PERIPH | 50FF_FFFF-5000_0000 | 16 MB | Always MMIO |
| NOR_A3 | 4FFF_FFFF-4B00_0000 | 80 MB | Configurable MMIO/DRAM |
| NOR_A2 | 4AFF_FFFF-4900_0000 | 32 MB | Configurable MMIO/DRAM |
| NOR_A1 | 48FF_FFFF-4800_0000 | 16 MB | Configurable MMIO/DRAM |
| IRAM_RSVD | 47FF_FFFF-4100_0000 | 112 MB | Configurable MMIO/DRAM |
| IRAM | 40FF_FFFF-4000_0000 | 16 MB | Always MMIO |
| PCIE_A3 | 3FFF_FFFF-1000_0000 | 768 MB | Configurable MMIO/DRAM |
| PCIE_A2 | 0FFF_FFFF-0200_0000 | 224 MB | Configurable MMIO/DRAM |
| PCIE_A1 | 01FF_FFFF-0100_0000 | 16 MB | Configurable MMIO/DRAM |
| IROM_LOVEC | 00FF_FFFF-0000_0000 | 16 MB | Configurable MMIO/DRAM |

Method 200 further includes identifying an outstanding target memory channel of an outstanding transaction at 208. An outstanding transaction may refer to a transaction request that has not been fulfilled and/or a transaction for which a response has yet to be received and/or observed at a processor core. As indicated at 210, the outstanding target memory channel may be identified by a direction bit of a counter. In examples including only two target memory channel options, such as DRAM and MMIO, a single bit may be designated to indicate the target memory channel of an outstanding transaction. However, in examples including more than two target memory channel options, the direction bit may actually comprise a number of bits capable of differentiating between each of the target memory channels. The remaining bits of the counter may be designated to indicate the number of outstanding transactions. Thus, the method 200 further includes identifying the number of outstanding transactions at 212. The number of outstanding transactions may be determined by evaluating the value (e.g., the decimal value) of remaining bits of the counter, as indicated at 214.

Figure 3:
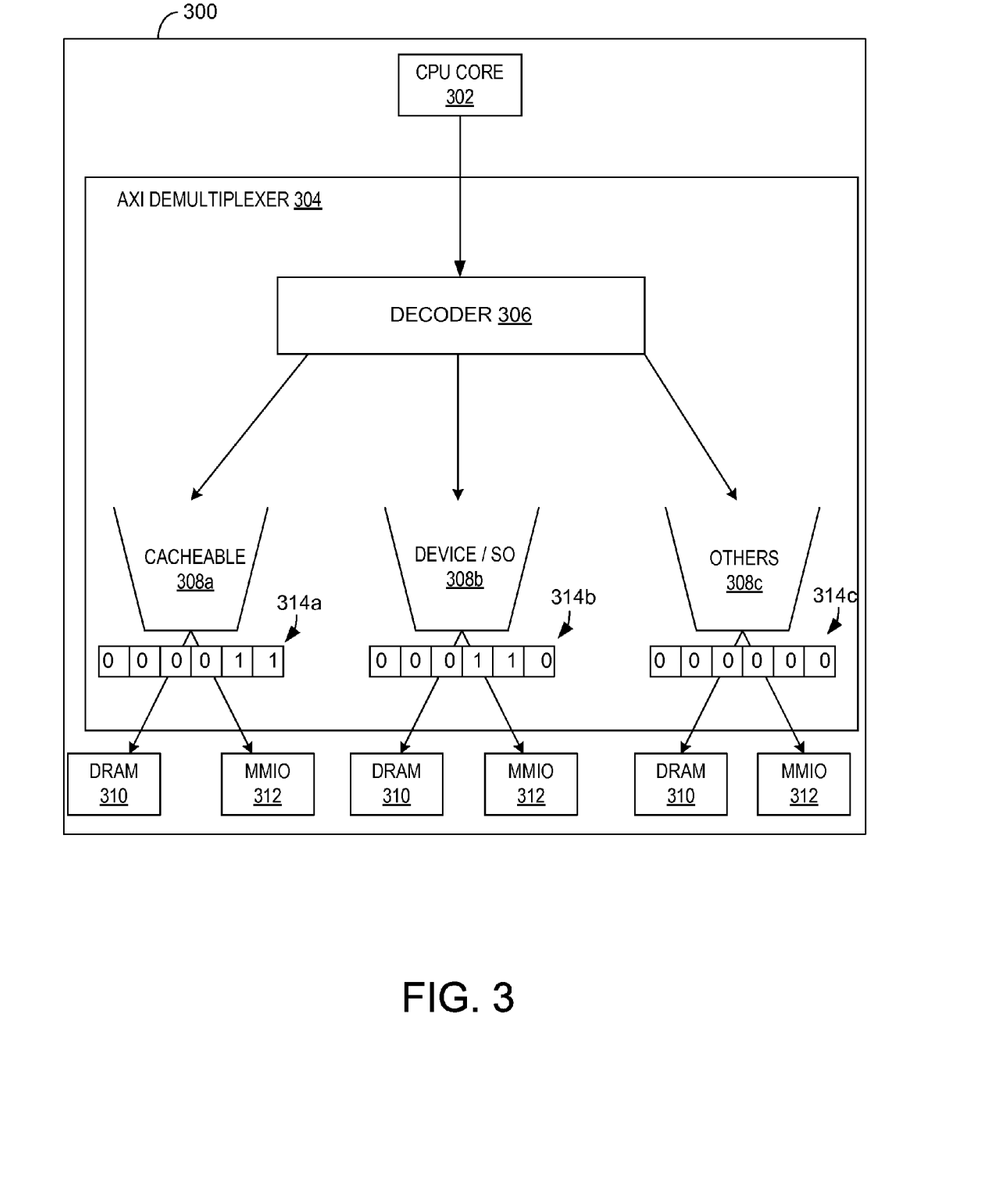
FIG. 3 schematically shows a transaction ordering system in accordance with an embodiment of the present disclosure.

Turning briefly to FIG. 3, a schematic representation of an embodiment of a transaction ordering system 300 is illustrated. As shown in FIG. 3, a CPU core 302 transmits a transaction request targeted to a particular memory channel. The transaction request is sent to a demultiplexer 304, such as the AXD 118 of FIG. 1, and analyzed by a decoder 306 to determine an identifier and/or current target memory channel. Based on the analysis of the transaction request, the request is sorted into a bucket corresponding to the identifier and/or current target memory channel of the request. For example, the buckets may include a cacheable memory bucket 308a, a device/strongly-ordered (SO) memory bucket 308b, and an others bucket 308c. Accordingly, requests with identifiers and/or current target memory channels that represent a cacheable memory type are directed to the cacheable memory bucket 308a, requests with identifiers and/or current target memory channels that represent a device or strongly-ordered memory type are directed to the device/SO memory bucket 308b, and all other requests are directed to the others bucket 308c. Although three buckets are illustrated in FIG. 3, it is to be understood that any suitable number of buckets corresponding to any suitable number of identifiers and/or current target memory channels may be utilized.

As shown in FIG. 3, each bucket may direct requests to two possible target memory channels—namely, DRAM 310 or MMIO 312. The target memory channels for each bucket are illustrated as separate units to aid in visualization, however it is to be understood that any request sent to DRAM 310 may be sent to the same DRAM memory channel, regardless of the bucket from which the request originates. In some embodiments, each bucket may have a different interface for the target memory channels assigned thereto, such that requests from each bucket pass through a respective target memory channel interface to the targeted memory channel.

Figure 4:
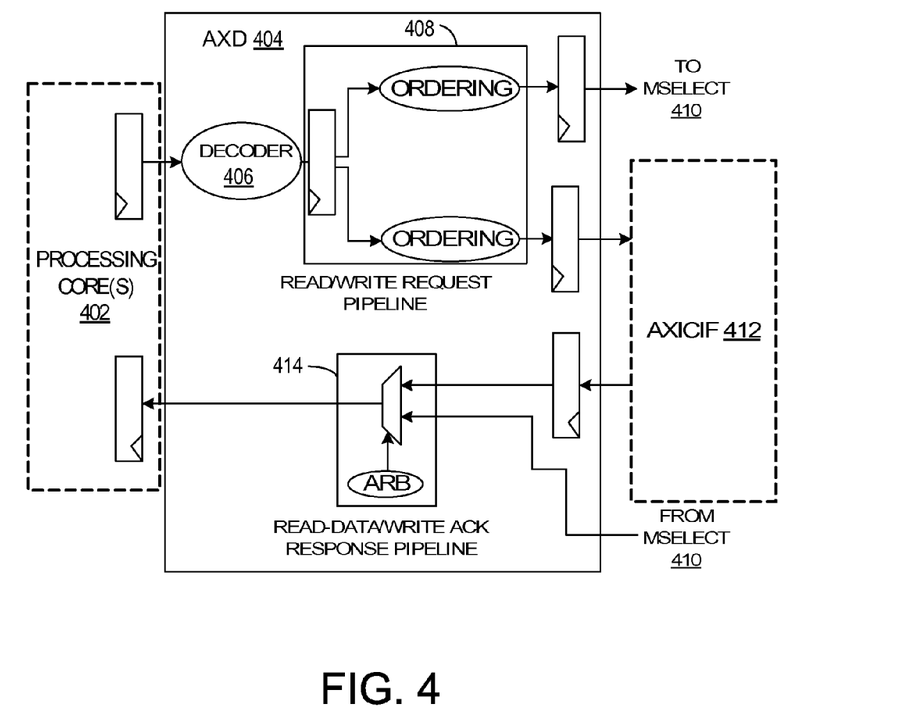
FIG. 4 schematically shows a request pipeline and a response pipeline for a transaction ordering system in accordance with an embodiment of the present disclosure.

Turning briefly to FIG. 4, an example pipeline for read/write requests and read/write responses is illustrated. As shown, requests may be generated and/or sent from a processor core 402, such as CPU core 302 of FIG. 3, to an AXI demultiplexer (AXD) 404 for processing. The request may be address decoded via decoder 406, then passed along the appropriate path (e.g., the uppermost path when the address indicates an MMIO request or the lowermost path when the address indicates a DRAM channel request) based on the ordering processing carried out by the ordering module 408 (e.g., the method 200 of FIG. 2). The ordering module 408 may include a plurality of buckets, such as buckets 308a-308c of FIG. 3, for sorting and ordering incoming transaction requests. Transaction requests are then selectively passed from the ordering module 408 to MSELECT 410 or AXICIF 412 based on the address of the transaction request and the ordering process. The response pipeline follows the reverse path, whereby transaction responses are sent from MSELECT 410 or AXICIF 412 to the AXD 404, and to the processor core 402. Responses may be processed by response module 414 in order to arbitrate between responses received from both memory channels.

Turning back to FIG. 3, each bucket may also be associated with a counter (e.g., counters 314a-c) to indicate a number of outstanding transactions for a respective bucket and an outstanding memory target or previous outstanding transaction request serviced by the respective bucket. Outstanding transactions may include requests that have been sent to a memory target and have not yet been returned and/or generated a response. For example, an outstanding write transaction may include a transaction for which a write request has been sent to a memory target, and an acknowledgement has not yet been generated or returned to the CPU. As there are only two possible targets for a request, a single bit of the counter may be utilized to identify the direction, or memory target, of the most recent outstanding transaction. While any bit(s) of the counter may be utilized to represent the direction bit in embodiments of the present disclosure, the least significant bit serves as the direction bit in the example illustrated in FIG. 3. In some embodiments, the direction bit may be stored as a separate value, independent of the counter. Likewise, values of the direction bit may be assigned to valid memory targets in any suitable manner.

Returning to FIG. 2, the method 200 includes determining whether the current target memory channel matches an outstanding target memory channel at 216. For example, the current target memory channel may be compared to the outstanding target memory channel. If the target memory channels do not match, the method 200 proceeds to 218, to determine whether the counter is equal to zero. For example, the remaining bits outside of any direction bits may be evaluated to determine a decimal value. If a passing condition is met, the passing condition including the counter being equal to zero and/or the current target memory channel matching an outstanding target memory channel, the method 200 includes passing the incoming transaction request downstream at 220, setting/clearing the direction bit as appropriate, and incrementing the counter (e.g., by one). For example, the incoming transaction request may be passed to the current target memory channel. Conversely, if the counter is not equal to zero and the current target memory channel does not match an outstanding target memory channel, the incoming transaction request may be held, as indicated at 222. For example, the incoming transaction may be added to a bucket and/or queue until such time as the counter is equal to zero and/or the current target memory channel matches the direction bit of the counter (e.g., when a previously-held transaction request is passed along, changing the direction bit to match the current target memory channel). Once the counter is equal to zero and/or the current target memory channel matches the direction bit of the counter, the incoming transaction may be released and passed along to the associated target memory channel, and the direction bit may be set/cleared as appropriate and the counter incremented (e.g., by one).

In the example illustrated in FIG. 3, a direction bit of "0" indicates an outstanding target memory channel of DRAM 310, while a direction bit set to "1" indicates an outstanding target memory channel of MMIO 312. Exemplary values for the counter are provided in FIG. 3 for the purpose of explanation of the request ordering scenarios described herein, and it is to be understood that the counter may hold different values in different scenarios. The counters illustrated in FIG. 3 include one direction bit and five remaining bits (e.g., for indicating a number of outstanding requests for the memory channel indicated by the direction bit), however any suitable number of remaining bits may be included in the counter. In some embodiments, the counter may comprise a number of bits that represent a maximum decimal value greater than or equal to a maximum number of outstanding transactions able to be issued by all CPUs. In such embodiments, saturation or overflow of the counter may be avoided by ensuring that the counter is able to represent the maximum number of outstanding transactions. Additionally or alternatively, the demultiplexer 304 may perform a check for saturation or overflow of the counter prior to passing or holding a request, and hold the request if the counter is determined to be saturated.

With reference to counter 314a of the cacheable memory bucket 308a, the least significant bit is set to "1," while the decimal value of the counter is "1." Accordingly, using the exemplary counter configuration and assignments described above, the cacheable bucket includes one outstanding transaction that targeted MMIO 312. If a new request having an identifier assigned to or otherwise associated with the cacheable memory bucket 308a is received at the demultiplexer 304, the request is analyzed to determine the current target memory channel of the new request. If the current target memory channel of the new request is the MMIO 312 (for example, the current target memory channel matches the outstanding target memory channel indicated by the direction bit of the counter 314a), the request is passed along to MMIO 312 and the counter incremented, even though the counter indicates the presence of an outstanding transaction.

Conversely, if the current target memory channel of the new request is the DRAM 310 (for example, the current target memory channel does not match the outstanding target memory channel indicated by the direction bit of the counter 314a), the request is held in the cacheable memory bucket 308a until the counter returns to zero or the direction bit is changed to match the current target memory channel of that request. For example, if a response is received for the outstanding transaction, the counter 314a is decremented by 1, causing the counter to indicate 0 outstanding transactions for MMIO 312. Responsive to such an indication, the previously held request may be sent to DRAM 310, causing the direction bit of the counter to change to "0" (the bit value assigned to DRAM 310 in this example). Additionally, the remaining bits of the counter indicating the number of outstanding transactions are incremented (thereby returning to a value of "1") responsive to sending the previously held request to DRAM 310.

Referring now to the counter 314c associated with the others bucket 308c, if a request having an identifier assigned to or otherwise associated with the others bucket 308c is received at the demultiplexer 304, the request is passed along to the current target memory channel of that request. Since the counter 314c indicates that there are no outstanding transactions for the others bucket 308c, the request may be passed along regardless of the associated current target memory channel or the target memory channel of the last transaction directed to the others bucket 308c and the counter may be incremented.

The selective holding of transactions described above enables the system to ensure that transaction responses are received in accordance with ordering requirements associated with an on-chip communication specification. Each memory channel (e.g., DRAM 310 and MMIO 312) processes requests in the order received, however one memory channel may process requests more quickly than another memory channel. Thus, order may be maintained within each memory channel, while order is not guaranteed between multiple memory channels. Accordingly, multiple transaction requests may be sent to the same target memory channel without waiting for responses while maintaining order. Likewise, transaction requests may be sent to a new target memory channel if there are no outstanding requests for a previous target memory channel.

It will be readily apparent that the transaction ordering examples described herein may be implemented on any type of computing system, such as computing system 10 in FIG. 1. A bus demultiplexer (e.g., AXD 118) and/or executable instructions stored on a memory device and/or a data-holding subsystem (e.g., cache 116 of FIG. 1) of the computing system and/or the bus demultiplexer may be configured to perform the transaction ordering methods described herein. For example, processing logic (e.g., CPUs 108 and/or Shadow CPU 105 of FIG. 1) may be configured to execute the instructions to perform the transaction ordering. In addition to or instead of executable instructions, the processing logic hardware of the computing system itself may include hardware operative to provide the ordering functionality described herein.

It will be appreciated that methods described herein are provided for illustrative purposes only and are not intended to be limiting. Accordingly, it will be appreciated that in some embodiments the methods described herein may include additional or alternative processes, while in some embodiments, the methods described herein may include some processes that may be reordered, performed in parallel or omitted without departing from the scope of the present disclosure. Further, it will be appreciated that the methods described herein may be performed using any suitable software and hardware in addition to or instead of the specific examples described herein. This disclosure also includes all novel and non-obvious combinations and sub-combinations of the above systems and methods, and any and all equivalents thereof.

The invention claimed is:

1. A method of ordering transactions across a bus of a computing device, the method comprising:
    determining a current target memory channel for an incoming transaction request;
    passing the incoming transaction request downstream when:
        (a) the current target memory channel matches an outstanding target memory channel indicated by a direction bit of a counter identifying a number of outstanding requests for the outstanding target memory channel and the counter is greater than zero; or
        (b) the counter identifying the number of outstanding requests equals zero; and
    holding the incoming transaction request if the counter is greater than zero and the current target memory channel does not match the outstanding target memory channel.

2. The method of claim 1, wherein determining the current target memory channel comprises decoding an address of the incoming transaction request.

3. The method of claim 1, wherein holding the incoming transaction request comprises holding the incoming transaction request in a selected bucket of a plurality of buckets.

4. The method of claim 3, further comprising determining an identifier for the incoming transaction request, and wherein the selected bucket is selected based on the identifier of the incoming transaction request.

5. The method of claim 4, further comprising incrementing the counter by one responsive to passing the incoming transaction request downstream and decreasing the counter by one when an outstanding transaction associated with the outstanding target memory channel is returned, and wherein the incoming transaction request is released from the selected bucket responsive to the counter returning to zero.

6. The method of claim 3, wherein the counter is associated with the selected bucket, the plurality of buckets each being associated with a different counter.

7. The method of claim 1, wherein the current target memory channel is one of DRAM and MMIO.

8. The method of claim 1, wherein the direction bit indicates that the outstanding target memory channel is one of DRAM and MMIO.

9. The method of claim 1, wherein the bus is an AXI bus and the incoming transaction request is an AXI transaction request.

10. The method of claim 1, further comprising performing a check to determine whether the counter is saturated prior to passing the incoming transaction request and prior to holding the incoming transaction request.

11. A computing system comprising:
    a central processing unit (CPU) configured to execute executable instructions held in a data-holding subsystem;
    a bus connecting the CPU to a plurality of memory channels; and
    a bus demultiplexer positioned between the CPU and the plurality of memory channels to process transactions for the CPU, the bus demultiplexer including a transaction address decoder, a transaction ordering channel, a first port corresponding to the first memory channel, and a second port corresponding to the second memory channel, the bus demultiplexer and/or executable instructions configured to:
        determine a current target memory channel for an incoming transaction;
        compare the current target memory channel to a direction bit of a counter, the direction bit indicating an outstanding target memory channel of an outstanding transaction and the counter identifying a number of outstanding requests for the outstanding target memory channel;
        pass the incoming transaction request to the current target memory channel and increment the counter when:
            (a) the current target memory channel matches the outstanding target memory channel and the counter is greater than zero, or
            (b) a number of outstanding transactions indicated by the counter equals zero; and hold the incoming transaction request if the number of outstanding transactions indicated by the counter is greater than zero and the current target memory channel does not match the outstanding target memory channel.

12. The computing system of claim 11, wherein the bus is an AXI bus.

13. The computing system of claim 11, wherein the plurality of memory channels includes at least MMIO and DRAM.

14. The computing system of claim 11, wherein the bus demultiplexer is further configured to determine an identifier for the incoming transaction request, and wherein holding the incoming transaction request comprises holding the incoming transaction request in a selected bucket of a plurality of buckets.

15. The computing system of claim 14, wherein the CPU is one of a plurality of CPUs, each CPU being associated with a different set of the plurality of buckets.

16. The computing system of claim 14, wherein the selected bucket is associated with the counter, and each bucket of the plurality of buckets is associated with a different counter.

17. The computing system of claim 11, wherein the counter comprises a number of bits that represent a maximum decimal value greater than or equal to a maximum number of outstanding transactions able to be issued by the CPU.

18. A method of ordering transactions across a bus of a computing device, the method comprising:

determining a current target memory channel for an incoming transaction request;

identifying an outstanding target memory channel of one or more outstanding transactions indicated by a direction bit of a counter;

identifying a number of outstanding transactions for the outstanding target memory channel, the number indicated by a value of remaining bits of the counter;

passing the incoming transaction request to the current target memory channel and incrementing the counter when at least one passing condition is met, the at least one passing condition including:
  (a) the current target memory channel matching the outstanding target memory channel and the counter is greater than zero, or
  (b) the value of the remaining bits of the counter equaling zero; and holding the incoming transaction request while the value of the remaining bits of the counter does not equal zero if the value of the remaining bits of the counter is greater than zero and the current target memory channel does not match the outstanding target memory channel.

19. The method of claim 18, wherein the counter is assigned to a selected bucket of a plurality of buckets.

20. The method of claim 19, wherein the selected bucket is selected based on an identifier of the incoming transaction request.

* * * * *